(12) United States Patent
Sawamura

(10) Patent No.: US 6,179,424 B1
(45) Date of Patent: Jan. 30, 2001

(54) OPTICAL SYSTEM FOR A PROJECTOR

(75) Inventor: Shigeru Sawamura, Sakai (JP)

(73) Assignee: Minolta Co., Ltd., Osaka (JP)

( * ) Notice: Under 35 U.S.C. 154(b), the term of this patent shall be extended for 0 days.

(21) Appl. No.: 09/478,847

(22) Filed: Jan. 7, 2000

(30) Foreign Application Priority Data

Jan. 18, 1999 (JP) .................................................. 11-008671

(51) Int. Cl.⁷ ................................................. G03B 21/00
(52) U.S. Cl. .............................. 353/33; 353/81; 353/99; 348/771
(58) Field of Search ................................. 353/98, 99, 81, 353/33; 348/742, 743, 771; 345/31

(56) References Cited

U.S. PATENT DOCUMENTS

| | | | |
|---|---|---|---|
| 5,552,922 | * 9/1996 | Magarill | 353/81 |
| 5,612,753 | 3/1997 | Poradish et al. | 348/743 |
| 5,633,755 | 5/1997 | Manabe et al. | 359/443 |
| 5,868,480 | 2/1999 | Zeinali | 353/31 |
| 5,905,545 | 5/1999 | Poradish et al. | 348/743 |

FOREIGN PATENT DOCUMENTS

| | | |
|---|---|---|
| 9-96867 | 4/1997 | (JP) . |
| 9-98422 | 4/1997 | (JP) . |

\* cited by examiner

*Primary Examiner*—David M. Gray
*Assistant Examiner*—Rochelle Blackman
(74) *Attorney, Agent, or Firm*—Sidley & Austin

(57) ABSTRACT

An optical apparatus has a reflection-type spatial light modulator having a plurality of minute variable-reflection-angle mirrors that individually deflect the light incident thereon in one of two different directions, namely in a first direction or in a second direction, in accordance with a signal fed in, an optical system to which the light deflected in the first direction by the modulator is directed, a prism disposed between the modulator and the optical system so as to direct the light deflected in the first direction by the modulator to the optical system and direct the light deflected in the second direction by the modulator to a side face of the prism, and a light-expelling member having a polyhedral shape and disposed with an entrance face thereof kept in close contact with the side face of the prism. The light-expelling member is so designed that the light deflected in the second direction by the modulator enters the light-expelling member through the entrance face thereof and exits from the light-expelling member through a face thereof other than the entrance face.

16 Claims, 5 Drawing Sheets

OPTICAL SYSTEM FOR A PROJECTOR

This application is based on application No. H11-008671 filed in Japan on Jan. 18, 1999, the entire content of which is hereby incorporated by reference.

BACKGROUND OF THE INVENTION

1. Field of the Invention

The present invention relates to an optical system for a projector, and particularly to such an optical system for a projector as incorporates a reflection-type spatial light modulator, such as a digital mirror device™ (or DMD™ for short, manufactured by Texas Instruments Incorporated; hereinafter referred to simply as a digital mirror device or DMD), that is provided with a large number of variable-reflection-angle mirror elements that can vary the reflection angle of the light incident thereon in accordance with a video signal so that only the light corresponding to the video signal will be reflected toward a projection optical system.

2. Description of the Prior Art

In recent years, as higher and higher resolution is desired in images in general, also in the field of projectors, development of techniques has been sought that achieve a substantial increase in the number of pixels without making the optical system larger. One attempt to meet such needs is the development of a projector employing a DMD.

A DMD is produced by forming a large number of minute rectangular high-reflectance mirror elements, of which the inclination is variable in accordance with a video signal, on a silicon memory chip by a process as used to manufacture a semiconductor device. A projector employing such a DMD, by varying the inclination of those mirror elements, controls the direction in which it reflects the illumination light incident thereon in such a way as to converge only the desired parts of the reflected light on a screen and thereby project a desired image thereon.

In accordance with a video signal, the individual mirror elements of a DMD, when in an on state, reflect light toward a projection optical system and, when in an off state, change their inclination to reflect light in a different direction so that the light will not enter the projection optical system. However, owing to restrictions imposed on the design of a projector, the light reflected from the mirror elements when they are in an off state is shone on a side-wall portion of a prism constituting a prism system disposed between the DMD and the projection optical system, and therefore there is a possibility of this light being further reflected therefrom so as to enter the projection optical system.

In particular, when the prism is surrounded by a medium, such as air, having a small refractive index, most of the above-mentioned light shone on the side-wall portion of the prism is reflected from the inner surface of the side-wall portion of the prism, and this greatly increases the amount of such secondary-reflection light. This secondary-reflection light (unnecessary, or stray, light), when it enters the projection optical system, may cause another image (a ghost) separate from the normal image to appear on the screen.

One way to prevent such entry of secondary-reflection light into the projection optical system is to form the side-wall portion of the prism into a diffusive surface that diffuses the light incident thereon. Another way is to paint the outer surface of the side-wall portion of the prism black, or to vapor-deposit on that surface a light-absorbing dielectric film, or to affix to that surface a member having a bottom surface so shaped as to absorb light so that this bottom surface will absorb light and convert it into heat.

The method of absorbing light and converting it into heat by the use of a member having a bottom surface so shaped as to absorb light is adopted, for example, in the projector-oriented optical system disclosed in Japanese Laid-Open Patent Application H9-96867. In this optical system, a heat-dissipating member having a comb-tooth-shaped bottom surface is arranged so as to face a side wall of a prism, with a shock-absorbing pad in between, in such a way that this bottom surface is kept in close contact with the shock-absorbing pad. In this optical system, the recessed portions of the comb-tooth-shaped bottom surface absorb light and convert it into heat, and the heat-dissipating member as a whole dissipates the resulting heat.

However, even if light is diffused, it is inevitable that part of the diffused light will enter the projection optical system. It is practically impossible to form a black thin film that completely absorbs the light incident thereon, and therefore, even if a black thin film is applied, some light, left unabsorbed, may enter the projection optical system. It is difficult to produce a member having so intricate a shape as to absorb completely the light incident thereon, and therefore it is inevitable that part of the incident light will be reflected or diffused in the vicinity of the protruding portions of the comb-tooth-shaped bottom surface of this member.

SUMMARY AND WORKING PRINCIPLE OF THE INVENTION

An object of the present invention is to provide a projector-oriented optical system in which entry of unnecessary light into a projection optical system is prevented more strictly than ever.

To achieve the above object, according to one aspect of the present invention, an optical apparatus is provided with: a reflection-type spatial light modulator having a plurality of minute variable-reflection-angle mirrors that individually deflect the light incident thereon in one of two different directions, namely in a first direction or in a second direction, in accordance with a signal fed in; an optical system to which the light deflected in the first direction by the modulator is directed; a prism disposed between the modulator and the optical system so as to direct the light deflected in the first direction by the modulator to the optical system and direct the light deflected in the second direction by the modulator to a side face of the prism; and a light-expelling member having a polyhedral shape and disposed with an entrance face thereof kept in close contact with the side face of the prism. The light-expelling member is so designed that the light deflected in the second direction by the modulator enters the light-expelling member through the entrance face thereof and exits from the light-expelling member through a face thereof other than the entrance face.

In this optical apparatus, preferably, the light-expelling member has a second flat face opposite to the entrance face and is so designed that the entrance face and the second flat face approach each other according as the distance to the modulator decreases, and that the angle $\theta$ formed between the two lines lying where the entrance face and the second flat face respectively cut the plane that includes both a normal to the entrance face and the optical axis of the optical system fulfills the condition $$\theta \geq 1/2[\sin^{-1}(n_1/n_2) - \sin^{-1}\{(n_1/n_2)\sin \alpha_1\}]$$

where $n_1$ represents the refractive index of the prism, $n_2$ represents the refractive index of the light-expelling member, and $\alpha_1$ represents the minimum angle of incidence of light incident on the entrance face.

According to another aspect of the present invention, a projector is provided with: an illumination optical system that includes a light source and that emits the illumination light generated by the light source; a reflection-type spatial light modulator having a plurality of minute variable-reflection-angle mirrors that individually deflect the illumination light emitted from the illumination optical system in one of two different directions, namely in a first direction or in a second direction, in accordance with a signal fed in; a projection optical system to which the light deflected in the first direction by the modulator is directed; a prism disposed between the modulator and the optical system so as to direct the illumination light emitted from the illumination optical system to the modulator, direct the light deflected in the first direction by the modulator to the optical system, and direct the light deflected in the second direction by the modulator to a side face of the prism; and a light-expelling member having a polyhedral shape and disposed with an entrance face thereof kept in close contact with the side face of the prism. The light-expelling member is so designed that the light deflected in the second direction by the modulator enters the light-expelling member through the entrance face thereof and exits from the light-expelling member through a face thereof other than the entrance face.

In this projector, preferably, the light-expelling member has a second flat face opposite to the entrance face and is so designed the entrance face and the second flat face approach each other according as a distance to the modulator decreases, and that the angle θ formed between the two lines lying where the entrance face and the second flat face respectively cut the plane that includes both a normal to the entrance face and the optical axis of the optical system fulfills the condition $$\theta \geq 1/2[\sin^{-1}(n_1/n_2) - \sin^{-1}\{(n_1/n_2)\sin \alpha_1\}]$$

where $n_1$ represents the refractive index of the prism, $n_2$ represents the refractive index of the light-expelling member, and $\alpha_1$ represents the minimum angle of incidence of light incident on the entrance face.

In the optical apparatus and the projector described above, the light shone on the side face of the prism enters the light-expelling member. The light having entered the member reaches one of the faces of the member, and is then transmitted therethrough or reflected therefrom in accordance with the angle of incidence. The reflected light reaches another face, and is then, in a similar manner, transmitted therethrough or reflected therefrom. Even the light that is reflected repeatedly, after being reflected several times, eventually strikes one of the faces at an angle of incidence smaller than the critical angle, and is thus transmitted therethrough.

The light transmitted outward through any one of the faces is thereby driven out of the member. However, in this construction, light is not transmitted outward through the face that is kept in close contact with the prism, but is driven out through one of the faces other than that face. Specifically, for example, light is always shone on the close-contact face at an angle of incidence larger than the critical angle. In this way, it is possible to prevent unnecessary light from returning to the prism (and thus entering the (projection) optical system).

Assume that FIG. 1 is a sectional view of the light-expelling member used in the optical apparatus or projector described above along the plane that includes both a normal to the first flat face (what is called the entrance face above) of the member and the optical axis of the (projection) optical system. In FIG. 1, consider, for example, a case where light, coming from inside the prism 22, enters the member 5 through the bottom face (the first flat face) 5a thereof, at a position P1 thereon, is then reflected from the top face (the second flat face) 5b, at a position P2 thereon, and is then reflected from the bottom face 5a, at a position P3 thereon. Here, assume that the angle of incidence and the angle of emergence at the position P1 are $\alpha_1$ and $\alpha_2$, respectively, the angle of incidence at the position P2 is $\alpha_4$, the angle of incidence at the position P3 is $\alpha_5$, and the angle (hereafter the vertex angle) that the bottom face 5a and the top face 5b form on the plane of FIG. 1 is θ. Moreover, assume that $\alpha_3$ is equal to $90°-\alpha_4$.

Then, according to Snell's law, at the position P1, $$n_1 \sin \alpha_1 = n_2 \sin \alpha_2 \qquad (1)$$

Rearranging Expression (1) gives $$\sin \alpha_2 = (n_1/n_2)\sin \alpha_1 \quad \alpha_2 = \sin^{-1}\{(n_1/n_2)\sin \alpha_1\} \qquad (2)$$

Since the sum of the interior angles of a triangle equals 180°, $$\alpha_3 = 180° - 90° - \theta - \alpha_2 \qquad (3)$$
$$= 90° - \theta - \alpha_2$$

Substituting Expression (3) in the relation $\alpha_3 = 90° - \alpha_4$ gives $$\alpha_4 = 90° - (90° - \theta - \alpha_2) \qquad (4)$$
$$= \theta + \alpha_2$$

Since an exterior angle of a triangle equals the sum of the interior opposite angles corresponding thereto, at the position P3, $$\alpha_5 + 90° = \theta + \alpha_3 + 2\alpha_4 \qquad (5)$$

Substituting Expressions (3) and (4) in Expression (5) and rearranging the resulting expression with respect to $\alpha_5$ gives $$\alpha_5 = \theta + (90° - \theta - \alpha_2) + 2(\theta + \alpha_2) - 90° \qquad (6)$$
$$= 2\theta + \alpha_2$$

Substituting Expression (2) in Expression (6) gives $$\alpha_5 = 2\theta + \sin^{-1}\{(n_1/n_2)\sin \alpha_1\} \qquad (7)$$

At the position P3, if the angle of incidence $\alpha_5$ is greater than the critical angle, $$n_1 \leq n_2 \sin \alpha_5 \qquad (8)$$

Thus, rearranging Expression (8) gives $$\alpha_5 \geq \sin^{-1}(n_1/n_2) \qquad (9)$$

Substituting Expression (7) in Expression (9) gives $$2\theta + \sin^{-1}\{(n_1/n_2)\sin \alpha_1\} \geq \sin^{-1}(n_1/n_2) 2\theta \geq \sin^{-1}(n_1/n_2) - \sin^{-1}\{(n_1/n_2)\sin \alpha_1\} \theta \geq 1/2[\sin^{-1}(n_1/n_2) - \sin^{-1}\{(n_1/n_2)\sin \alpha_1\}] \qquad (10)$$

As described above, for the angle of incidence $\alpha_5$ at the position P3 to be reater than the critical angle, Expression (10) needs to be fulfilled. Expression (10) defines the lower limit of the vertex angle θ. Expression (10) shows that, the smaller the angle of incidence $\alpha_1$, the greater the lower limit of the vertex angle θ. Accordingly, as long as the member 5 is so formed as to have a vertex angle θ that fulfills Expression (10), assuming that the minimum angle of incidence of the light entering the member 5 through the bottom face 5a thereof equals $\alpha_1$, light never returns to the prism through the bottom face 5a. Note that all rays of light travel along a plane substantially parallel to the plane of section shown in FIG. 1. Accordingly, the member 5 needs to be so designed that its first and second flat faces 5a and 5b fulfill Expression (10) on a plane parallel to the plane that includes both a normal to the first flat face 5a and the optical axis of the projection optical system.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, embodiments of the present invention will be described with reference to the accompanying drawings.

First Embodiment

Figure 2:
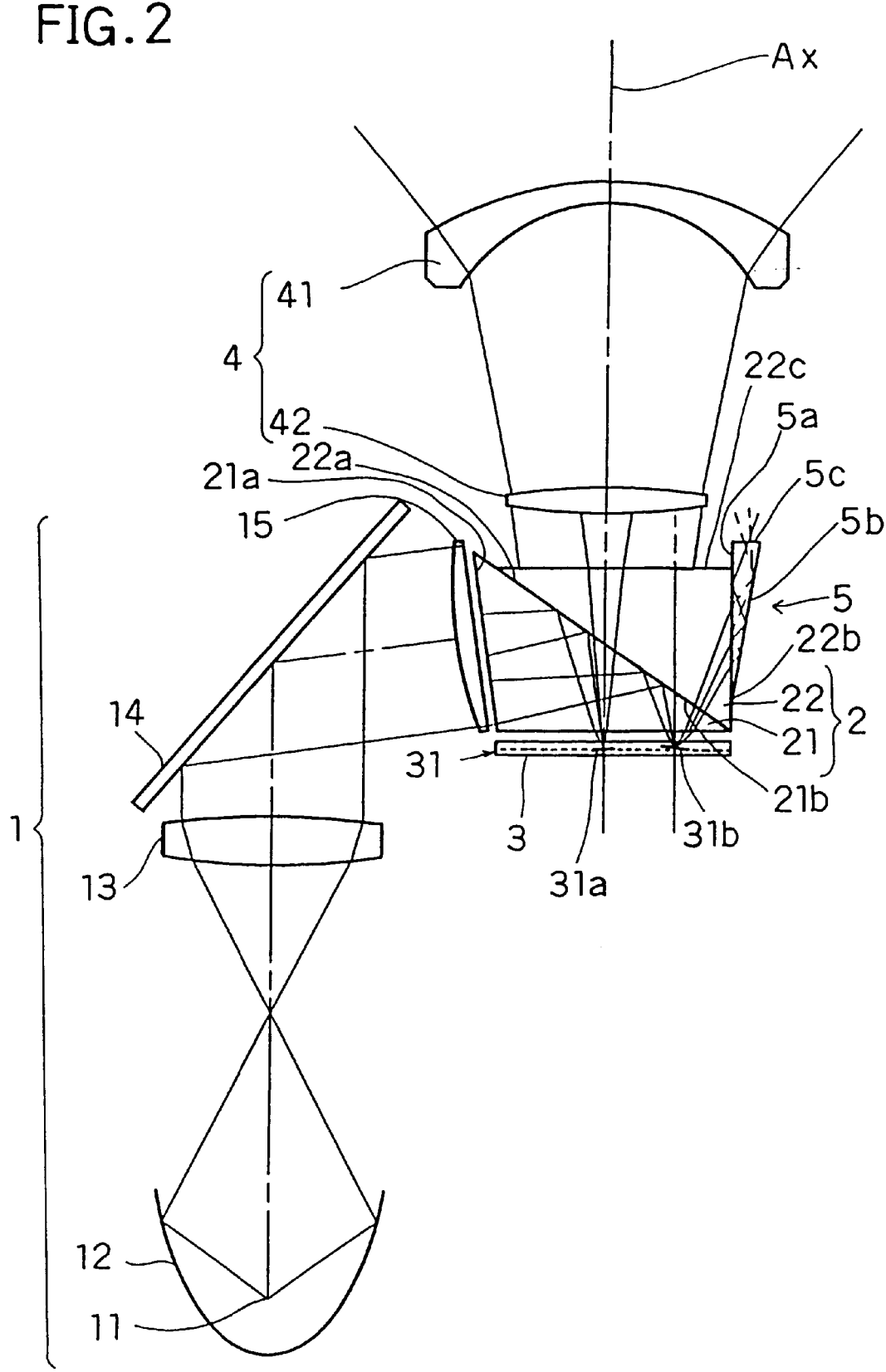
FIG. 2 is a horizontal sectional view of the projector-oriented optical system of a first embodiment of the invention.

FIG. 2 is a horizontal sectional view of the projector-oriented optical system of a first embodiment of the invention. This projector-oriented optical system is provided with an illumination optical system 1, an optical-path-splitting prism system 2, a DMD 3, and a projection optical system 4.

The illumination optical system 1 is composed of a light source 11 that emits white light, a reflector 12 that is a mirror with a surface having the shape of an ellipsoid of revolution, a parallel-beam-forming lens 13, a mirror 14, and a condenser lens 15. In the illumination optical system 1, the light emitted from the light source 11 is first reflected from the reflector 12, is then formed into a parallel beam by the parallel-beam-forming lens 13, is then reflected from the mirror 14, and is then condensed by the condenser lens 15, before the light is eventually directed, as illumination light, to the optical-path-splitting prism system 2.

The optical-path-splitting prism system 2 is composed of two prisms 21 and 22 that are cemented together in such a way that their respective faces 21b and 22a face each other with a layer of air in between. Owing to this cemented structure of the optical-path-splitting prism system 2, the illumination light that has entered the prism 21 through the face 21a thereof is totally reflected from the face 21b of the prism 21, and is thereby directed to the DMD 3.

The DMD 3 is provided with a mirror surface 31 formed of a huge number of mirror elements (rectangular mirrors made of aluminum) arranged on a substrate, and the direction in which the individual mirror elements constituting this mirror surface 31 reflect light can be switched between two directions (about 20° apart from each other). The switching of the reflection direction is achieved by the individual mirror elements, acting like pixels, being turned on and off in accordance with a video signal fed to the DMD 3. Of the entire light reflected from the mirror surface 31 of the DMD 3, the light reflected, as signal light, from the mirror elements in an on state, i.e. the light corresponding to the video signal, is transmitted through the optical-path-splitting prism system 2, and is then projected through the projection optical system 4 on a screen placed in front. The projection optical system 4 is composed of a plurality of lenses (of which only the front-end and rear-end lenses 41 and 42 are shown in FIG. 2).

As described above, this projector-oriented optical system employs only one DMD 3. In a case where this optical system is used to project a color image, a color wheel is additionally provided within the illumination optical system 1, and the color wheel is driven in such a way that light of three colors (R), (G), and (B) enters the DMD 3 cyclically, one color after another. In this case, the DMD 3 needs to be controlled in accordance with video signals corresponding to those three colors.

Now, the light reflected from the mirror surface 31 of the DMD 3 will be described. For simplicity's sake, only two 31a and 31b of the mirror elements constituting the mirror surface 31 are schematically shown in the figures referred to in the following descriptions. Here, it is assumed that the mirror element 31a is in an on state and the mirror element 31b is in an off state.

The light incident on the mirror surface 31 of the DMD 3 is fed, as described above, from the illumination optical system 1 through the optical-path-splitting prism system 2. Meanwhile, the light is made to strike the mirror surface 31 from a direction that forms a predetermined angle with the optical axis Ax of the projection optical system 4.

Of all the individual mirror elements constituting the mirror surface 31, those for which the pixel signals included in the video signal fed to the DMD 3 are on reflect the light incident thereon along the optical axis Ax of the projection optical system 4, and those for which the pixel signals are off reflect the light incident thereon toward a side wall 22b of the prism 22. As a result, a certain proportion of unnecessary light strikes the side wall 22b of the prism 22.

Figure 3:
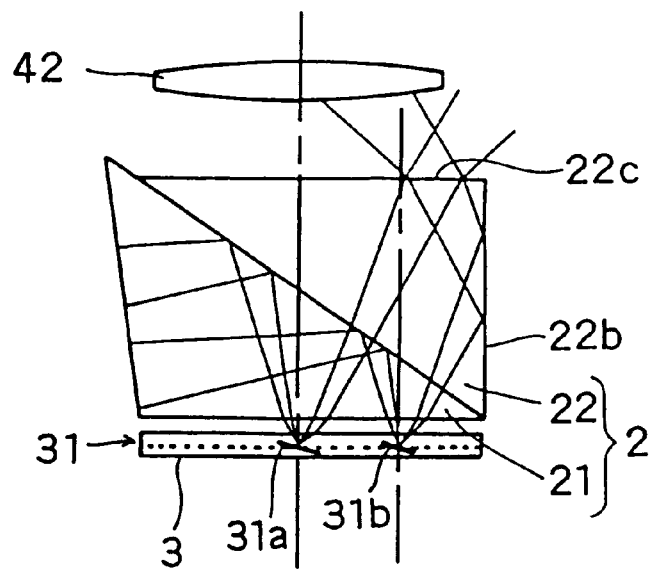
FIG. 3 is a sectional view of part of a projector-oriented optical system in which no measures are taken against unnecessary light.

Now, suppose that, as shown in FIG. 3, air exists outside this side wall 22b. Then, the light incident on this side wall 22b is totally reflected therefrom, and is thus allowed to travel forward, as secondary-reflection light, through the front face 22c of the prism (in FIG. 3, it is assumed that both of the mirror elements 31a and 31b are in an off state). As a result, in this construction, such secondary-reflection light is allowed to travel through the projection optical system 4 and is thereby made to converge in an unexpected position on the screen, causing an unexpected image (a ghost) to appear on the screen together with the normal projected image.

To prevent this, in this embodiment, an unnecessary-light-expelling member 5 for expelling unnecessary light is affixed to the outer surface of the side wall 22b of the prism 22 (see FIG. 2). The unnecessary-light-expelling member 5 is made of a material having a refractive index higher than the prism 22, and is affixed in such a way that the bottom face 5a thereof is kept in close contact with the outer surface of the side wall 22b. The unnecessary-light-expelling member 5 has the shape of a wedge. In the present specification, for convenience' sake, the face 5a that is kept in contact with the side wall 22b will be called the bottom face, and the face 5b opposite to the bottom face 5a will be called the top face.

Figure 1:
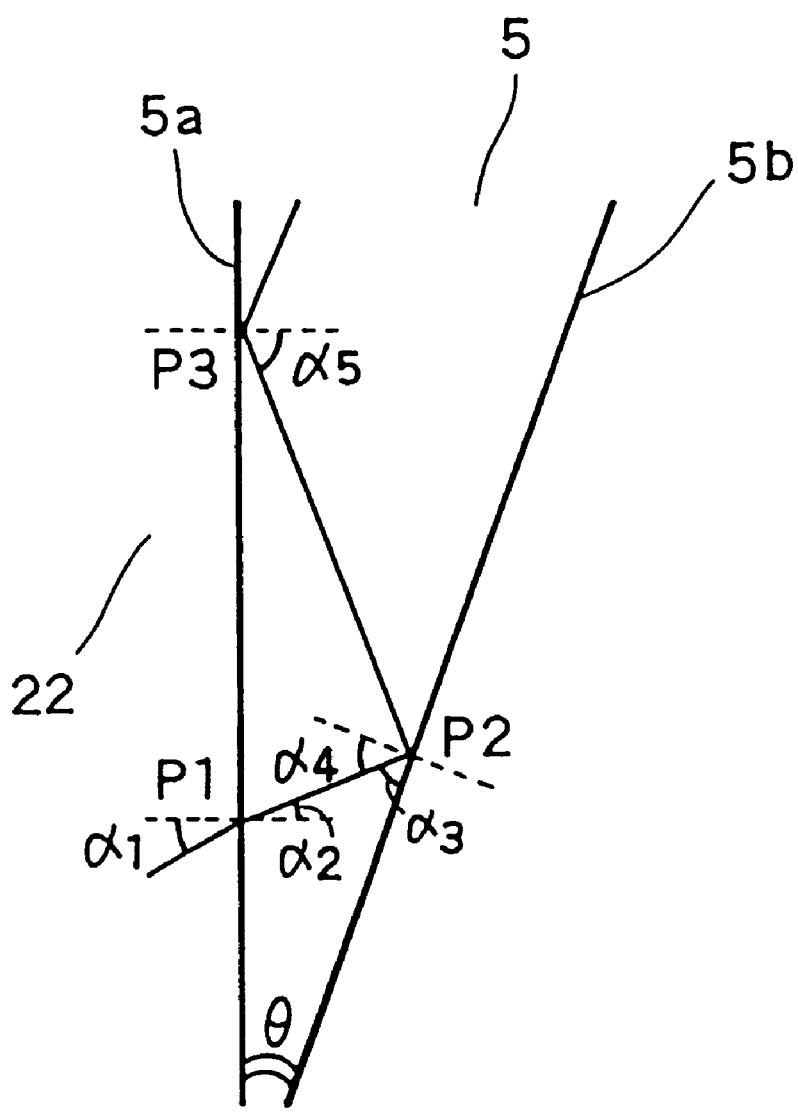
FIG. 1 is a diagram illustrating how the condition to be fulfilled by the angle between the top and bottom faces of the unnecessary-light-expelling member is determined.

Since the unnecessary-light-expelling member 5 has a refractive index higher than the prism 22, the unnecessary light striking the side wall 22b enters the unnecessary-light-expelling member 5 through the bottom face 5a thereof without being totally reflected at the interface in between. Inside the unnecessary-light-expelling member 5, this light then strikes the top face 5b, and part of the light is totally reflected from the top face 5b. The light thus totally reflected then strikes the bottom face 5a. Here, the unnecessary-light-expelling member 5 is so designed that all second-reflection light striking the bottom face 5a is totally reflected. Specifically, Condition (10) noted previously is fulfilled by the angle θ between two lines, one lying on the bottom face 5a and the other lying on the top face 5b, and both lying on an identical plane (for example, the plane of FIG. 1) parallel to the plane that includes both a normal to the bottom face 5a and the optical axis Ax of the projection optical system 4.

If, as shown in FIG. 2, the side wall 22b of the prism 22 is perpendicular to the mirror surface 31 of the DMD 3, the angle of incidence of unnecessary light striking the side wall 22b ranges from 0° to 90°. Within this range, the angle of incidence of strong unnecessary light ranges from 59.5° to 70.5°, and the angle of incidence of strong plus somewhat weak unnecessary light ranges from 51.7° to 83.4°. Here, strong unnecessary light refers to unnecessary light as will be observed clearly as a ghost when projected on the screen. On the other hand, somewhat weak unnecessary light refers to unnecessary light as will be observed dimly as a ghost and thus degrade the contrast of the normal image when projected on the screen.

Accordingly, if the angle θ fulfills Condition (10) when 59.5° is substituted therein as the minimum angle of incidence $\alpha_1$, it is possible to prevent entry of strong unnecessary light into the projection optical system 4. Similarly, if the angle θ fulfills Condition (10) when 51.7° is substituted therein as the minimum angle of incidence $\alpha_1$, it is possible to prevent entry of not only strong unnecessary light but also somewhat weak unnecessary light into the projection optical system 4. The greater the angle θ (within the range up to 90°), the less unnecessary light enters the projection optical system 4; however, an angle θ approximately equal to the lower limit of Condition (10), with 51.7° substituted therein, is sufficient to eliminate observable unnecessary light satisfactorily.

Figure 4:
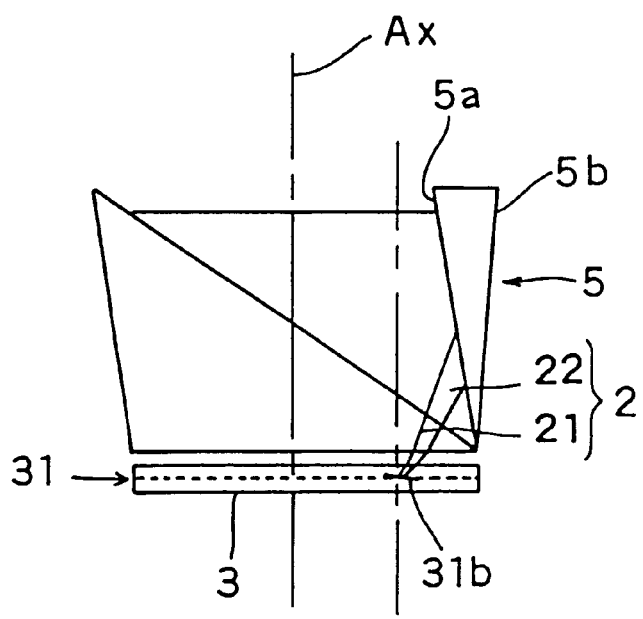
FIG. 4 is a sectional view of part of a projector-oriented optical system in which a side wall of a prism is arranged at 10° to a normal to the surface of a mirror.

In the projector-oriented optical system shown in FIG. 2, the side wall 22b of the prism 22 is perpendicular to the mirror surface 31 of the DMD 3. However, the side wall 22b does not necessarily have to be perpendicular to the mirror surface 31. FIG. 4 is a horizontal sectional view of a portion, including the prism system 2, unnecessary-light-expelling member 5, and DMD 3, of a projector-oriented optical system in which the side wall 22b is inclined approximately 10° toward the optical axis Ax as compared with the case shown in FIG. 2.

In this case, the angle of incidence of strong unnecessary light striking the side wall 22b ranges from 49.5° to 60.5°, and the angle of incidence of strong plus somewhat weak unnecessary light ranges from 41.7° to 73.4°. Here, the angle of incidence of unnecessary light has a different range, and therefore the minimum angle of incidence $\alpha_1$, which is to be substituted in Condition (10) in accordance with the desired level of reduction of unnecessary light, takes a different value than in the projector-oriented optical system shown in FIG. 2. To achieve the same level of reduction of unnecessary light as in the projector-oriented optical system shown in FIG. 2, the member 5 needs to be so shaped as to have a larger vertex angle θ than that shown in FIG. 2.

Having the structure described above, the unnecessary-light-expelling member 5 acts in the following manner. The second-reflection light striking the bottom face 5a is totally reflected therefrom. The reflected light is then, immediately or after being reflected several times between the top and bottom faces 5b and 5a, transmitted through the top face 5b or the side face 5c and thereby driven out of the member 5. Thus, almost no part of such second-reflection light enters the projection optical system 4.

Second Embodiment

Figure 5:
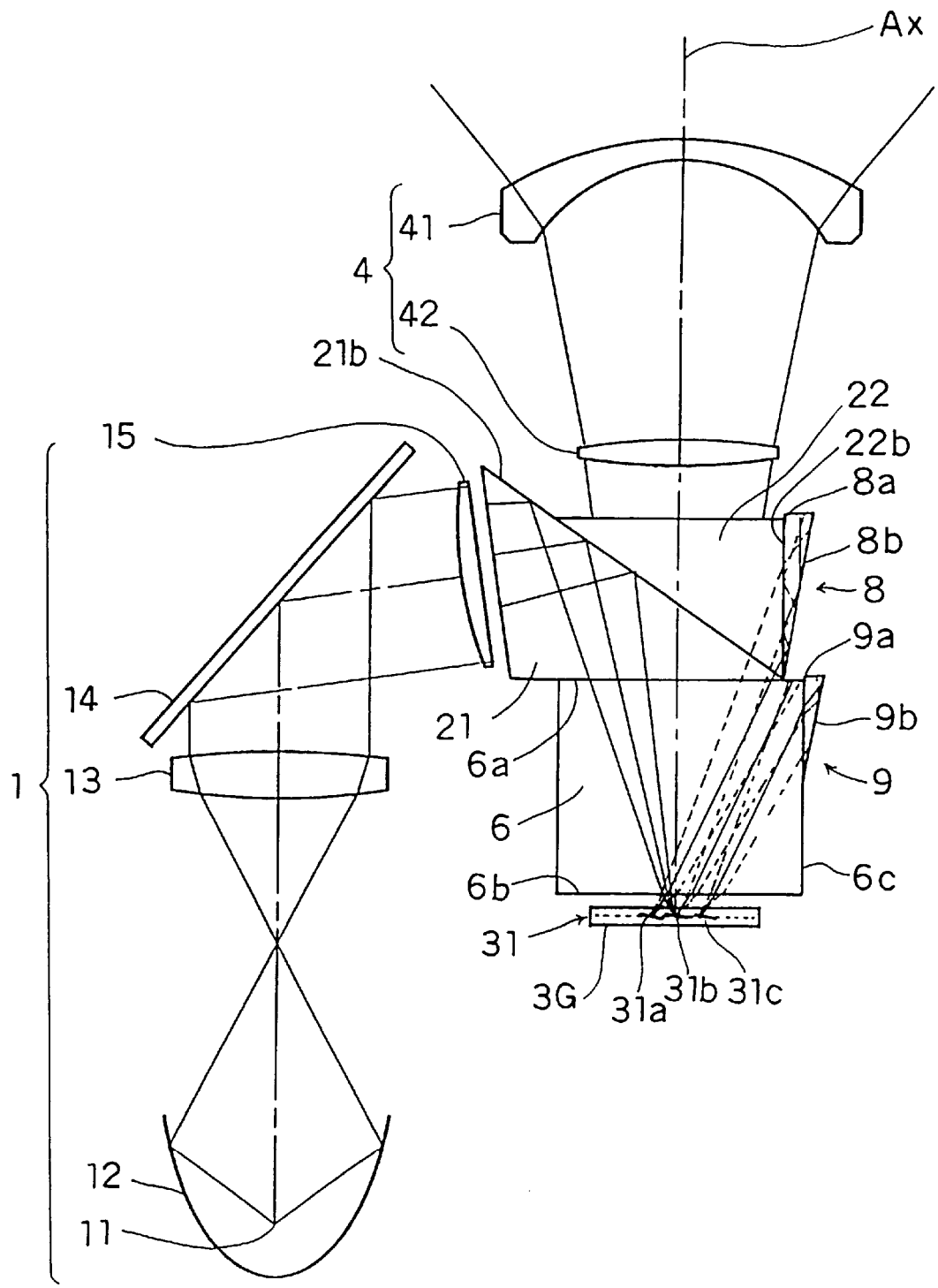
FIG. 5 is a horizontal sectional view of the projector-oriented optical system of a second embodiment of the invention.
Figure 6:
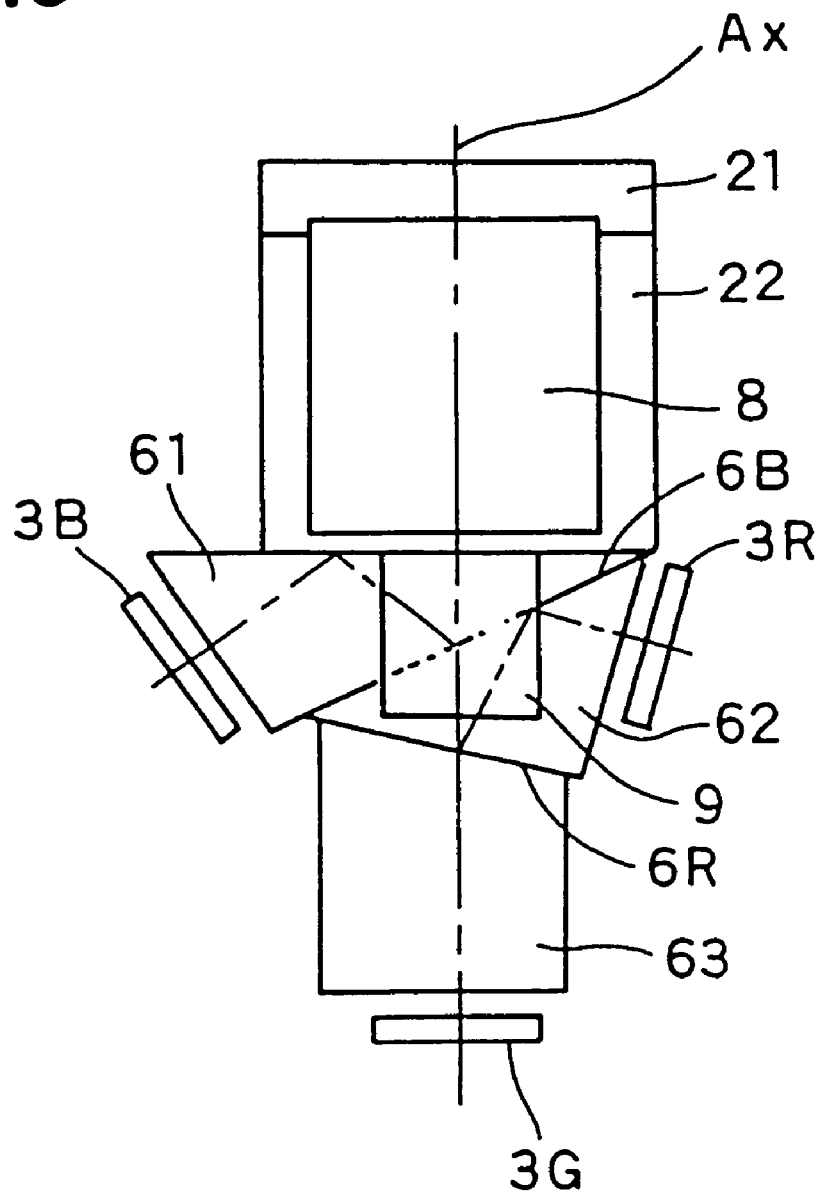
FIG. 6 is a top view of the projector-oriented optical system of the second embodiment, as seen from the side at which the unnecessary-light-expelling member is affixed.

FIG. 5 is a horizontal sectional view of the projector-oriented optical system of a second embodiment of the invention, and FIG. 6 is a top view of a portion thereof, including the prism system and DMD, as seen from the right side of FIG. 5. In this projector-oriented optical system, the illumination optical system 1, the optical-path-splitting prism system 2, and the projection optical system 4 have the same constructions as in the first embodiment; therefore, such components as are common to both of the first and second embodiments are identified with the same reference numerals, and overlapping descriptions will not be repeated.

This projector-oriented optical system differs from that of the first embodiment in that it is provided with three DMDs 3R, 3G, and 3B and a three-color-separating prism system 6. The three-color-separating prism system 6 separates the light it receives into light of three colors, i.e. R (red), G (green), and B (blue) light, which is then fed individually to the corresponding DMDs 3R, 3G, and 3B. The optical images of three colors formed on these DMDs 3R, 3G, and 3B are integrated together by the three-color-separating prism system 6 into a single color image, which is then projected through the projection optical system 4 on a screen placed in front.

As shown in FIG. 6, the three-color-separating prism system 6 is composed of three prisms 61, 62, and 63 cemented together. At the interface between the prisms 61 and 62 is provided a dichroic layer 6B that reflects only B light, and at the interface between the prisms 62 and 63 is provided a dichroic layer 6R that reflects only R light. Thus, the white light coming from the optical-path-splitting prism system 2 is separated into light of three colors, i.e. R, G, and B light, which is then directed to the DMDs 3R, 3G, and 3B disposed behind the prisms 62, 63, and 61, respectively.

These DMDs 3R, 3G, and 3B each have the same structure as the DMD 3 of the first embodiment. Now, how these DMDs 3R, 3G, and 3B act will be described with reference to FIG. 5, taking up, for simplicity's sake, only the DMD 3G as their representative. As shown in FIG. 5, the front face 6a and the rear face 6b of the three-color-separating prism system 6 and the mirror surface 31 of the DMD 3G are perpendicular to the optical axis Ax of the projection optical system 4. The light incident on the mirror surface 31 of the DMD 3G is fed from the illumination optical system 1 through the optical-path-splitting prism system 2 and the three-color-separating prism system 6. Meanwhile, the light is made to travel through the front and rear faces 6a and 6b of the prism system 6 and then strike the mirror surface 31 from a direction that forms a predetermined angle with the optical axis Ax of the projection optical system 4.

The individual mirror elements constituting the mirror surface 31 vary their reflection direction in the same manner as in the first embodiment. Accordingly, as shown in FIG. 5, a certain proportion of the light reflected from the mirror elements for which the pixel signals included in the video signal fed to the DMD 3G are off strike the side wall 6c or 22b of the three-color-separating prism system 6 or the optical-path-splitting prism system 2. If air exists outside these side walls 6c and 22b, then, as in the case described previously with reference to FIG. 3, the light striking the side walls 6c and 22b is totally reflected therefrom so as to enter the projection optical system 4, causing a ghost to appear.

In this embodiment, as in the first embodiment, unnecessary-light-expelling members 8 and 9 for expelling unnecessary light are affixed to the outer surfaces of the side walls 22b and 6c. The unnecessary-light-expelling members 8 and 9 each have, like the member 5 of the first embodiment, the shape of a wedge. The member 8 is affixed to the outer surface of the side wall 22b, and the member 9 is affixed to the outer surface of the side wall 6c.

The unnecessary-light-expelling member 8 is made of a material having a refractive index higher than the prism 22, and the unnecessary-light-expelling member 9 is made of a material having a refractive index higher than the prisms 61 and 62. The unnecessary-light-expelling members 8 and 9 are each, like the unnecessary-light-expelling member 5, so designed that Condition (10) is fulfilled by the angle θ that their bottom and top faces 8a and 8b or 9a and 9b form on a plane parallel to the plane that includes both a normal to the bottom face 8a or 9a and the optical axis Ax.

Most of the light entering the unnecessary-light-expelling member 9 is unnecessary light that appears after color integration, i.e. light traveling in the same direction. Accordingly, by designing the unnecessary-light-expelling member 9 in such a way that its top and bottom faces 9b and 9a form an angle θ on a plane parallel to the plane that includes the direction in which such unnecessary light travels (i.e. the plane that includes the optical axis Ax of the projection optical system 4) and thereby enabling the unnecessary-light-expelling member 9 to expel only the unnecessary light traveling in that direction, it is possible to expel a satisfactorily large proportion of unnecessary light. The unnecessary light having entered the unnecessary-light-expelling members 8 and 9 is driven out of them in the same manner as in the unnecessary-light-expelling member 5 of the first embodiment, and therefore overlapping descriptions will not be repeated.

In some cases, a portion of unnecessary light strikes the part of the front face 6a of the three-color-separating prism system 6 that is in contact with air. However, the angle of incidence of the unnecessary light striking this part is small, and therefore this portion of unnecessary light is transmitted therethrough and thereby expelled. Accordingly, there is no need to provide a further unnecessary-light-expelling member against the unnecessary light striking this part.

According to the present invention, it is possible to expel unnecessary light striking a side wall of a prism without fail and thereby prevent entry of unnecessary light into a projection optical system. This makes it possible to obtain ghost-free, high-contrast projected images. In addition, this can be achieved in a simple construction and simply by affixing an inexpensive member to the side wall of the prism.

Moreover, the above-mentioned member expels unnecessary light as light without converting it into heat, and thus helps save the prism from a heat load without providing a means for heat dissipation. Subjecting the prism to a heat load may lead to deformation or distortion of the prism and thus to misalignment of the optical path, making it impossible to obtain desired projected images. According to the present invention, it is possible to prevent such inconveniences at reasonable cost.

Obviously, many modifications and variations of the present invention are possible in light of the above teachings. It is therefore to be understood that within the scope of the appended claims, the invention may be practiced other than as specifically described.

What is claimed is:

1. An optical apparatus comprising:

a reflection-type spatial light modulator having a plurality of minute variable-reflection-angle mirrors, the mirrors individually deflecting light incident thereon in one of two different directions, namely in a first direction or in a second direction, in accordance with a signal fed in;

an optical system to which light deflected in the first direction by the modulator is directed;

a prism disposed between the modulator and the optical system so as to direct the light deflected in the first direction by the modulator to the optical system and direct light deflected in the second direction by the modulator to a side face of the prism; and a light-expelling member having a polyhedral shape and disposed with an entrance face thereof kept in close contact with the side face of the prism, the light-expelling member being so designed that the light deflected in the second direction by the modulator enters the light-expelling member through the entrance face thereof and exits from the light-expelling member through a face thereof other than the entrance face.

2. An optical apparatus as claimed in claim 1, wherein the optical system is a projection optical system that images light directed thereto on an image plane.

3. An optical apparatus as claimed in claim 1, wherein the light-expelling member acts on light within a wavelength range of visible light.

4. An optical apparatus as claimed in claim 1, wherein the light-expelling member is made of a medium that has a refractive index higher than a medium of which the prism is made.

5. An optical apparatus as claimed in claim 1, wherein the light-expelling member has a second flat face opposite to the entrance face and is so designed that the entrance face and the second flat face approach each other according as a distance to the modulator decreases, and that an angle θ formed between two lines lying where the entrance face and the second flat face respectively cut a plane that includes both a normal to the entrance face and an optical axis of the optical system fulfills the following condition:

$$\theta \geq 1/2[\sin^{-1}(n_1/n_2) - \sin^{-1}\{(n_1/n_2)\sin \alpha_1\}]$$

where $n_1$ represents a refractive index of the prism, $n_2$ represents a refractive index of the light-expelling member, and $\alpha_1$ represents a minimum angle of incidence of light incident on the entrance face.

6. An optical apparatus as claimed in claim 1,
wherein the prism is an optical-path-separating prism that directs illumination light to the modulator and that transmits the light deflected in the first direction by the modulator.

7. An optical apparatus as claimed in claim 6,
wherein the illumination light is separated by use of a color wheel into light of different colors that appear cyclically one color after another.

8. An optical apparatus as claimed in claim 1,
wherein the prism is a color-separating prism that directs illumination light to the modulator and that transmits the light deflected in the first direction by the modulator and meanwhile separates the light into light of different wavelength ranges.

9. An optical apparatus as claimed in claim 8,
wherein, as the modulator, so many modulators are provided as a number of wavelength ranges into which the light is separated.

10. A projector comprising:
an illumination optical system that includes a light source and that emits illumination light generated by the light source;
a reflection-type spatial light modulator having a plurality of minute variable-reflection-angle mirrors, the mirrors individually deflecting the illumination light emitted from the illumination optical system in one of two different directions, namely in a first direction or in a second direction, in accordance with a signal fed in;
a projection optical system to which light deflected in the first direction by the modulator is directed;
a prism disposed between the modulator and the optical system so as to direct the illumination light emitted from the illumination optical system to the modulator, direct the light deflected in the first direction by the modulator to the optical system, and direct light deflected in the second direction by the modulator to a side face of the prism; and
a light-expelling member having a polyhedral shape and disposed with an entrance face thereof kept in close contact with the side face of the prism, the light-expelling member being so designed that the light deflected in the second direction by the modulator enters the light-expelling member through the entrance face thereof and exits from the light-expelling member through a face thereof other than the entrance face.

11. A projector as claimed in claim 10,
wherein the light-expelling member acts on light within a wavelength range of visible light.

12. A projector as claimed in claim 10,
wherein the light-expelling member is made of a medium that has a refractive index higher than a medium of which the prism is made.

13. A projector as claimed in claim 10,
wherein the light-expelling member has a second flat face opposite to the entrance face and is so designed that the entrance face and the second flat face approach each other according as a distance to the modulator decreases, and that an angle θ formed between two lines lying where the entrance face and the second flat face respectively cut a plane that includes both a normal to the entrance face and an optical axis of the optical system fulfills the following condition:

$$\theta \geq 1/2[\sin^{-1}(n_1/n_2) - \sin^{-1}\{(n_1/n_2)\sin \alpha_1\}]$$

where $n_1$ represents a refractive index of the prism, $n_2$ represents a refractive index of the light-expelling member, and $\alpha_1$ represents a minimum angle of incidence of light incident on the entrance face.

14. A projector as claimed in claim 10,
wherein the illumination optical system has a color wheel and the illumination light is separated by use of the color wheel into light of different colors that appear cyclically one color after another.

15. A projector as claimed in claim 10,
wherein the prism is a color-separating prism that directs the illumination light to the modulator and that transmits the light deflected in the first direction by the modulator and meanwhile separates the light into light of different wavelength ranges.

16. A projector as claimed in claim 15,
wherein, as the modulator, so many modulators are provided as a number of wavelength ranges into which the light is separated.

\* \* \* \* \*